(12) United States Patent
Bradley (10) Patent No.: US 7,357,598 B1
(45) Date of Patent: Apr. 15, 2008

(54) APPARATUS AND METHOD FOR DEPLOYING GEOTEXTILE TUBES

(75) Inventor: Anthony S. Bradley, Valparaiso, FL (US)

(73) Assignee: Bradley Industrial Textiles, Inc., Valparaiso, FL (US)

( * ) Notice: Subject to any disclaimer, the term of this patent is extended or adjusted under 35 U.S.C. 154(b) by 1620 days.

(21) Appl. No.: 09/612,810

(22) Filed: Jul. 10, 2000

Related U.S. Application Data (60) Provisional application No. 60/147,316, filed on Aug. 5, 1999.

(51) Int. Cl.
*E02B 3/04* (2006.01)
*E02B 3/12* (2006.01)

(52) U.S. Cl. .............. 405/15; 405/19; 405/21; 405/111; 405/115

(58) Field of Classification Search ............. 405/15, 405/17, 19, 21, 115, 130, 111
See application file for complete search history.

(56) References Cited

U.S. PATENT DOCUMENTS

| | | | |
|---|---|---|---|
| 1,206,417 A | 11/1916 | Cunkle | |
| 1,642,204 A | 9/1927 | Hill | |
| 2,588,695 A | 3/1952 | Brady, et al. | |
| 3,373,568 A | * 3/1968 | Hornbostel, Jr. | |
| 3,561,219 A | 2/1971 | Nishizawa et al. | |
| 3,696,623 A | 10/1972 | Heine et al. | |
| 3,886,751 A | 6/1975 | Labora | |
| 3,911,170 A | * 10/1975 | Honjo et al. | ................ 427/140 |
| 3,957,098 A | * 5/1976 | Hepworth et al. | ............ 383/45 |
| 4,100,747 A | 7/1978 | Facon | |
| 4,275,493 A | 6/1981 | Matovich et al. | |
| 4,555,201 A | * 11/1985 | Paoluccio | ................... 405/117 |
| 4,690,585 A | 9/1987 | Holmberg | |
| 4,729,691 A | 3/1988 | Sample | |
| 4,878,446 A | 11/1989 | Vermeulen | |

(Continued)

FOREIGN PATENT DOCUMENTS

EP    0267661 A    5/1988

(Continued)

OTHER PUBLICATIONS

PCT International Search Report for International Application No. PCT/US00/21170 (search completed Nov. 13, 2000).

(Continued)

*Primary Examiner*—Raymond W Addie
(74) *Attorney, Agent, or Firm*—Dority & Manning, P.A.

(57) ABSTRACT

A geotextile container and system for constructing a water barrier or dam is disclosed. A system for maintaining fill material solids in position to form a barrier comprises an elongated sheet of geotextile material capable of coiling upon itself to form a helical structure. Further, a means for seaming the first elongated sheet into a tubular container and filling the container with solids is presented. Fill material solids may be held in position by a tubular shaped container that forms a barrier or dam. An inner liner also may be employed in the tubular container. Cradle tubes may be deployed on either side to hold the container in position, such as when the container is struck by high energy waves.

14 Claims, 11 Drawing Sheets

U.S. PATENT DOCUMENTS

| | | |
|---|---|---|
| 4,954,013 A | 9/1990 | Lamberton |
| 4,958,956 A | 9/1990 | Tanaka et al. |
| 4,981,392 A | 1/1991 | Taylor |
| 5,059,065 A | 10/1991 | Doolaege |
| 5,098,754 A | 3/1992 | Horstmyer |
| 5,125,767 A | 6/1992 | Dooleage |
| 5,158,395 A | 10/1992 | Holmberg |
| 5,232,429 A * | 8/1993 | Cizek et al. ................. 493/299 |
| 5,492,073 A | 2/1996 | Abraham |
| 5,505,557 A | 4/1996 | Bradley |
| 5,507,900 A * | 4/1996 | Mohammed et al. ....... 156/157 |
| 5,595,458 A | 1/1997 | Grabhorn |
| 5,857,806 A * | 1/1999 | Melin ......................... 405/115 |
| 5,865,564 A | 2/1999 | Miller et al. |
| 5,902,070 A | 5/1999 | Bradley |
| 6,056,438 A | 5/2000 | Bradley |
| 6,126,362 A * | 10/2000 | Carter et al. ................ 405/114 |

FOREIGN PATENT DOCUMENTS

| | | | |
|---|---|---|---|
| FR | 1487986 | | 10/1977 |
| GB | 1487986 | * | 6/1975 |
| GB | 1487986 | | 10/1977 |
| WO | WO9729246 | | 8/1997 |

OTHER PUBLICATIONS

PCT International Search Report for International Application No. PCT/NL97/00043; (search completed May 20, 1997).

* cited by examiner

APPARATUS AND METHOD FOR DEPLOYING GEOTEXTILE TUBES

CROSS REFERENCE TO RELATED APPLICATIONS

Priority is hereby claimed on application U.S. Ser. No. 60/147,316 which is a provisional application entitled: APPARATUS AND METHOD FOR DEPLOYING GEOTEXTILE TUBES" filed Aug. 5, 1999.

BACKGROUND OF THE INVENTION

The present invention relates to the art of geotextile containers of the type for maintaining fill material and more particularly to a method and apparatus for deploying same.

Conventional geotextile tubes, whether woven on a circular loom or formed by joining two or more mill widths of fabric, have a tendency of rolling forward, as well as backward during the process of filling the tube with solid material. This rolling also tends to occur when the filled tube is hit with forceful wave action.

In a typical application an elongated prior art geotextile container may be constructed with a water permeable geotextile fabric. This geotextile fabric can be defined by its Apparent Opening Size (A.O.S.) as it relates to a standard U.S. Sieve (100 A.O.S. material will retain 95% of all material passing through the 100 sieve).

Once a geotextile container has been filled to its capacity or intended capacity, the moisture or liquid that is present in the fill material can be either leached out of the material or evaporated. Should wave action or high tide allow the permeable geotextile container to gain water and form a slurry, the movement of water (hydrostatic pressure) within the container may cause the material that is smaller than 100 sieve to wash out of the container.

The more soil that washes out of the filled container, the more space is created inside the container to allow further movement of the sand or siliceous material within the container. With this movement, abrasion occurs to the filaments or yarns of the container. As this abrasion progresses, holes appear in the fabric that forms the walls of the container and allow the coarser material to destroy the geotextile fabric until most if not all of the fill has escaped.

The problems posed by storms of hurricane force can be attributed to the geotextile container comprised of a single longitudinal structure of fill (sand). The storm surge can cause the geotextile container to roll inward and in effect "walk" up the beach toward land. Once the geotextile container becomes so displaced from its intended position at which it optimally fights erosion of the beach, the possibility of damage to the beach from erosion increases.

The problems posed by rolling containers have been addressed in containers of the type disclosed in U.S. Pat. No. 5,125,767 having two water impermeable internal tubes with water. However, because such containers derive their heft from water, they tend to be less rigid than desirable in resisting movement from the force of wave action. Moreover, the construction of such containers restricts their maximum attainable height. The containers disclosed in U.S. Pat. No. 5,865,564 having two water-filled intercommunicating compartments also suffer from the foregoing deficiencies.

OBJECTS AND SUMMARY OF THE INVENTION

The present invention recognizes and addresses the foregoing disadvantages and others, of prior art constructions and methods. Accordingly, it is an object of the present invention to provide an improved method of stabilizing and positioning a geotextile tube or container.

It is a more particular object of the present invention to provide an improved cradle or foundation to assure the desired alignment of a geotextile container prior to the filling of the container with fill material of a solid nature.

It is a further object of the present invention to provide an improved cradle or chocks that will prevent the geotextile container from rolling during and after the filling of the container with fill material of a solid nature.

It is also an object of the present invention to provide an improved geotextile container and method of making same.

It is a more particular objective of the present invention to provide an improved geotextile container that has an improved structure for eliminating the particle movement that causes abrasion of the material forming the walls of the container.

It is a further object of the present invention to provide an improved method of topping off the sand-filled inner cavity or cavities of the geotextile containers with water before storms of destruction reach the mainland. The water allows the upper portion of the geotextile container to be resilient and energy-absorbing rather than presenting a non-yielding wall.

It is a further object of the present invention to provide reduced permeability inner tubes to act in rhythm with each other whereby the homogeneous material absorbs the energy of the storm action and counteractions of each independent inner tube. This eliminates the abrasion problem as particles remain inside the reduced permeability tubes.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the intention, as embodied and broadly described herein, an improved cradle for geotextile tubes and containers includes a water permeable (or non-permeable), or water proof fabric configured into a tubular shape and held in that shape by one or more methods of seaming, but not limited to stitching, sonic welding, gluing, heating, etc.

A method is provided that offers a solution to the tendency of prior art geotextile container structures to roll during the filling process. The geotextile container is filled with at least one reduced permeability inner tube called a ballast tube, which when filled separately with either sand, water or a combination of sand and water will bias the entire container against movement.

In accordance with the present invention, a so-called cradle tube can be attached and/or positioned parallel to the front of the geotextile container's footprint. Another cradle tube can be positioned parallel to the back side of the footprint. Accordingly, one of the cradle tubes is spaced on the toe or front footprint of the geotextile container to offer frontal support, while the other parallel cradle tube is placed on the back side of the footprint of the geotextile container. Thus, when the two parallel cradle tubes are filled, they provide a cradle that is positioned to allow the main geotextile container to be filled without the possibility of rolling or moving.

Such a cradle is desirably constructed in conjunction with what is known as a scour apron. A scour apron is a blanket formed of geotextile fabric that is spread out atop the beach where the waves tend to scour the beach and cause erosion of the beach. The scour apron is held in place by anchor tubes of any circumference such as 3 feet and fabricated completely around all sides of the blanket. The anchor tubes are filled with sand and sunk below the blanket down to and under the scour line of the beach. The purpose of deploying the anchor tubes below the scour line is to allow the wave action to flow over the anchor tubes, on top of the scour apron before hitting the geotextile container sitting on top of the apron. This construction further allows the wave action to dissipate up the beach before hitting the geotextile container, breaking the energy force and causing erosion.

Other objects of the invention are achieved by a method of inserting one or more permeable or reduced permeability smaller circumference elongated filler tubes into each of the fore and aft cradle tubes. Each of the four (4) filler tubes is then filled with sand or water or a combination of both. It is believed that a first combination of mostly sand will support the position of the main geotextile container. However, filling each of the two inner ballast tubes with water will support the geotextile container until the container can be permanently filled with sand or other solid material.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
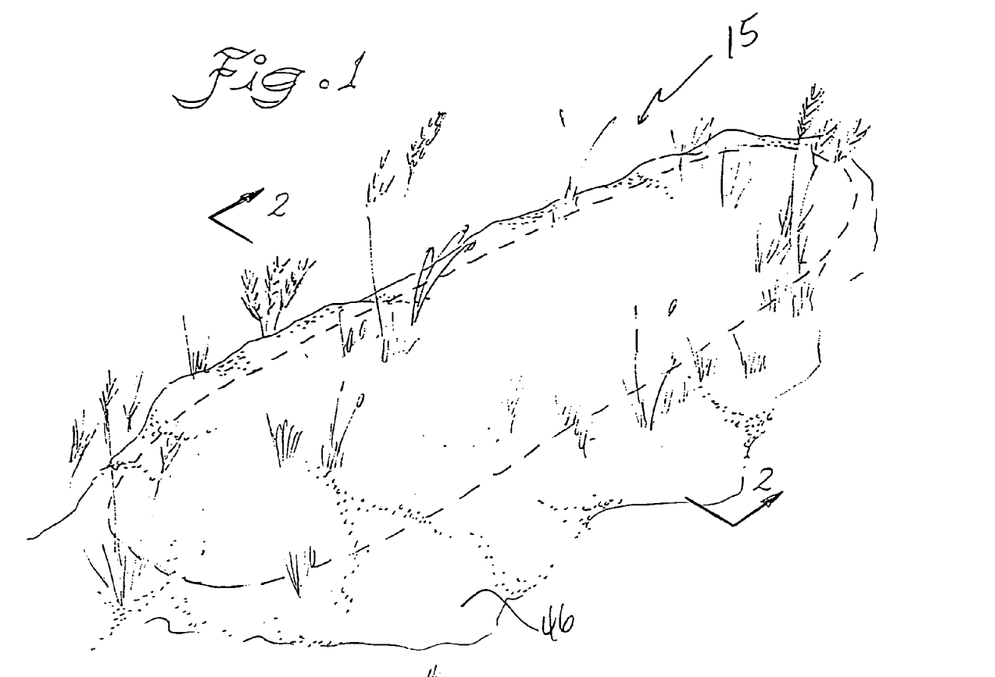
FIG. 1 is an elevated perspective view of an embodiment of the present invention shown in dashed outline at a period of time after it has been installed on a beach.
Figure 2:
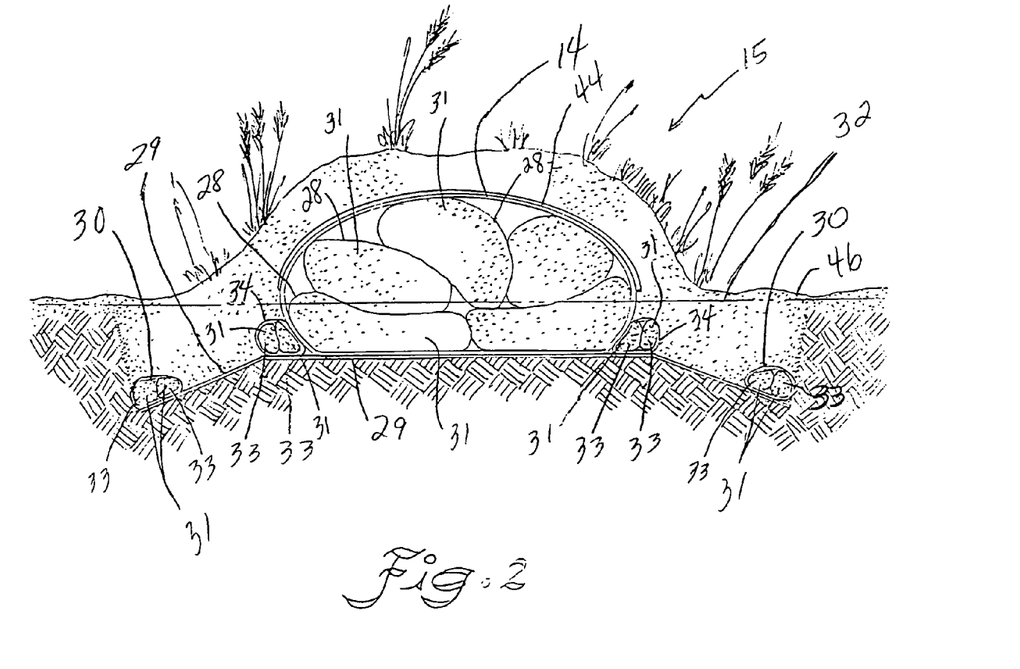
FIG. 2 is a cross-sectional view of the embodiment of the present invention taken along the lines 2-2 in FIG. 1.
Figure 3:
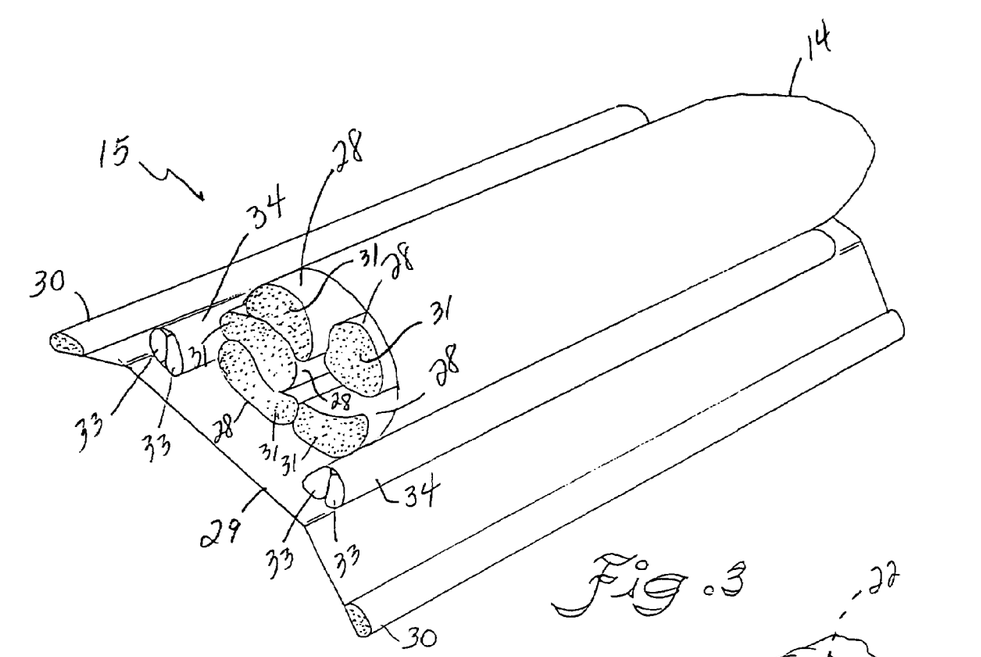
FIG. 3 is an elevated perspective view of an embodiment of the present invention like that shown in FIG. 1 with portions cut away.

A presently preferred embodiment of the apparatus and method of deploying a geotextile container 14 is schematically shown in FIGS. 1-3 and is represented generally by the numeral 15.

Figures 8A, 9:
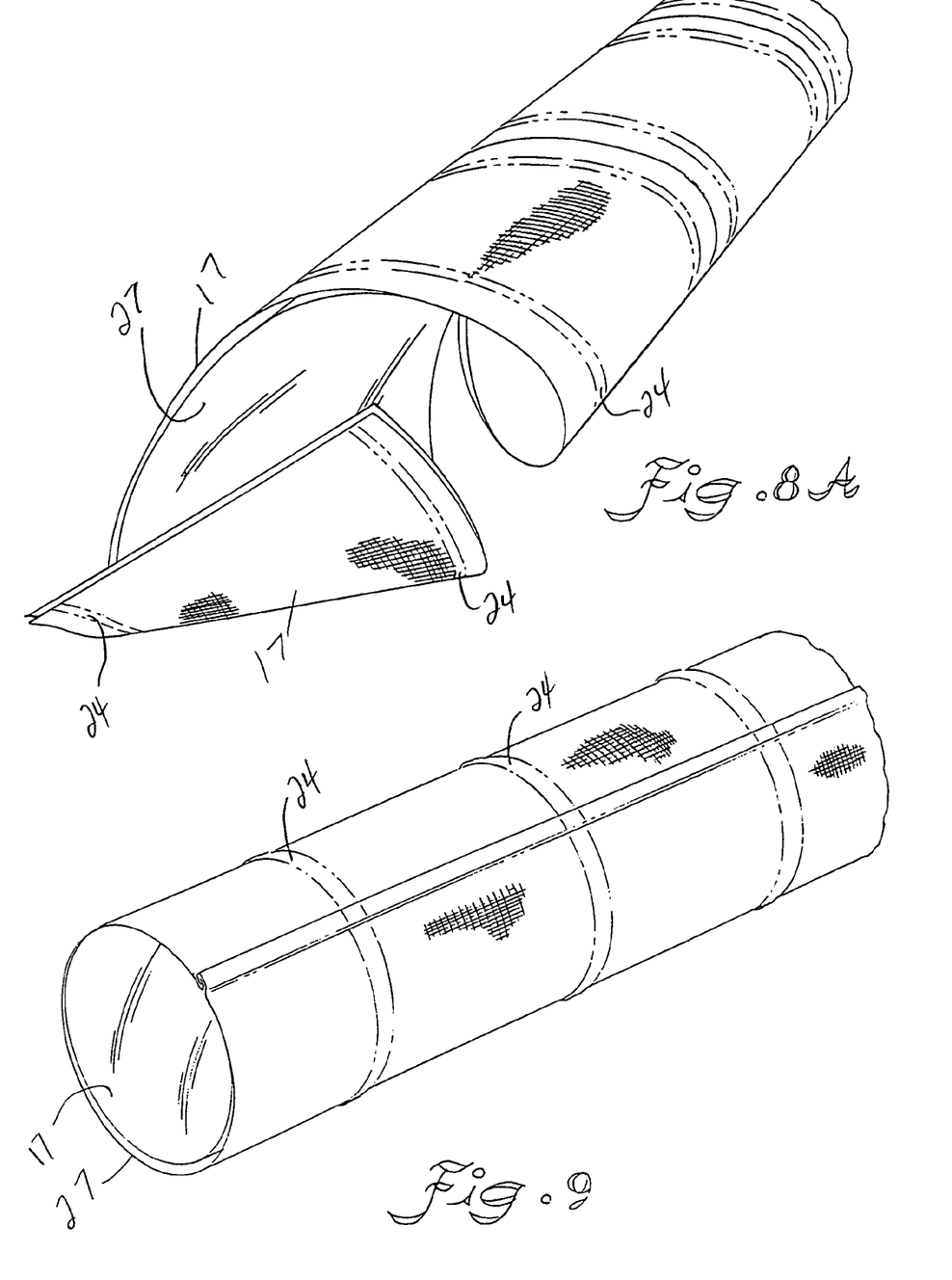
FIG. 8A is an elevated perspective view of a component of an embodiment of the present invention.
FIG. 9 is an elevated perspective view of an alternative component of an embodiment of the present invention.

The main geotextile container 14 desirably is formed from two layers of material that are combined to form the walls of the container. One of these layers is provided by a long geotextile fabric sheet 17 such as shown in FIG. 8A for example and having a width of about 7½ feet. The geotextile fabric 17 is a geotextile fabric that desirably is made from a high tenacity woven polyester having minimum strength values that vary depending on the application. A minimum strength of 1,000 pounds per inch per A.S.T.M. 4595 wide width test method is typical. However, a lower minimum strength on the order of 350 pounds per inch might be adequate for an application that was to be a temporary structure intended to last only about a year. Other applications might require a minimum strength of 4,000 pounds per inch or more. The geotextile fabric 17 is woven so that it is relatively tight when considered in view of the intended solid fill. Suitable geotextile fabric is sold under the trade name GEOTEX by Synthetic Industries located in Chattanooga, Tenn. It also is sold under the trade name MIRAFI by Nicolon located in Pendergrass, Ga. and the trade name COMTRAL by Huesker located in Germany. Bradley Industrial Textiles, of Valparaiso, Fla., the assignee of the present application, also sells suitable geotextile fabric sheets 17 under the trade name TXTUBE.

Figure 10:
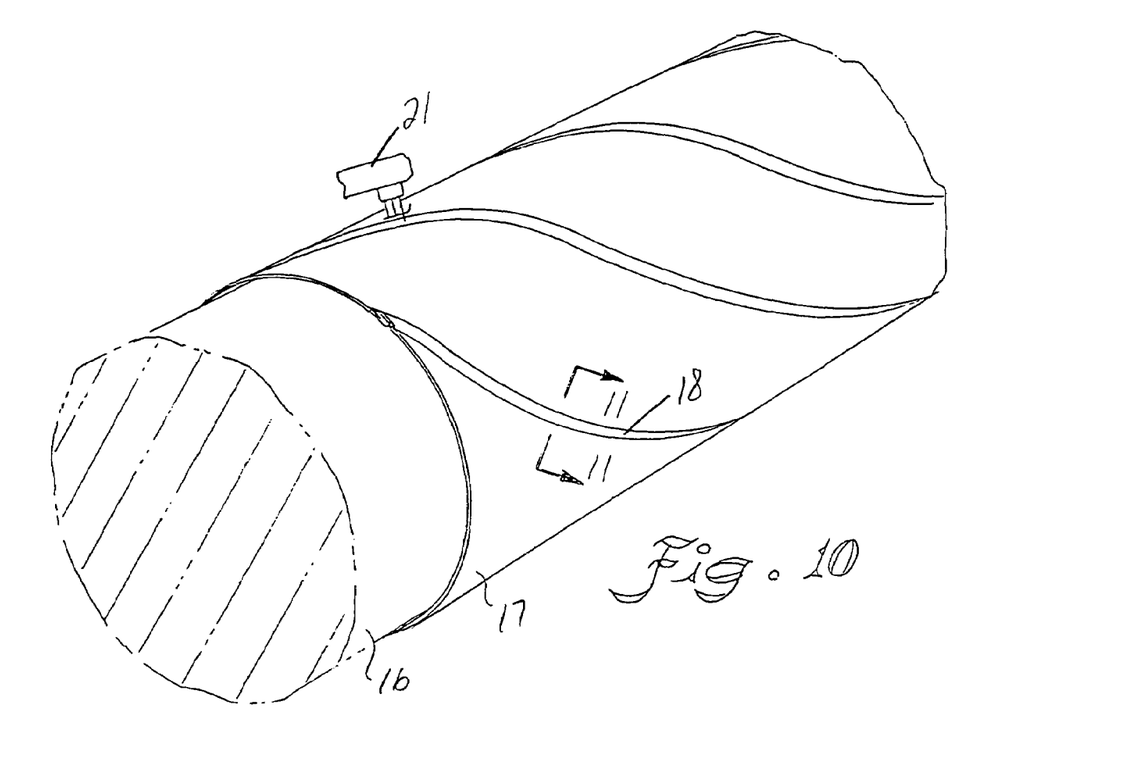
FIG. 10 is an elevated perspective view of the sewing step in the fabrication of a geotextile tube according to the method of the present invention.

As schematically shown in FIG. 8A, the sheet 17 of geotextile fabric is furled in a helical fashion to form a tubular shaped container of any desired diameter. As schematically shown in FIG. 10, this can be accomplished by draping the fabric 17 over a large cylindrical drum 16 and with the longitudinal axis of the sheet 17 disposed at an angle with respect to the axis of rotation of drum 16. This angle and the diameter of the drum will determine the circumference of the resulting container 14. As shown schematically in FIG. 11, the adjoining edges of the fabric sheet 17 are joined to form a spiral seam 18 composed of multiple thicknesses of the fabric. One configuration for such spiral seam 18 is a butterfly joint 19 that uses four thicknesses of the fabric that are joined as by stitches 20 made by a sewing machine 21. See commonly owned U.S. Pat. No. 5,902,070, which is hereby incorporated herein by this reference.

Desirably, the fabric sheet 17 of geotextile material is provided with a latex coating containing an ultraviolet inhibitor. A suitable latex coating is sold under the trade name ULTRACOAT by Nationwide Chemical Coatings located in Bradenton, Fla. However, only relatively narrow sheets 17 of geotextile fabric can be coated with a latex coating in an on-line process, which is the most efficient way of doing so. Since sheets 17 of narrower widths (7½ feet) are used in the manufacture of the geotextile container 14 of the present invention, these sheets 17 can be provided with the latex coating on-line before the sheets 17 are formed into the geotextile containers. Such coating offers additional long term protection from weathering, heat and ultra violet degradation. The coating is available in numerous colors to give a more aesthetic appearance to the container 14.

Though the geotextile container can be formed solely of the geotextile fabric sheet 17, the geotextile container 14 is desirably also provided with an inner liner 27 that is sewn inside the container to provide control over: (1) pressure during the fill process, (2) capture of fines, and (3) water and dredge discharge normally present during the filling process. Such liner 27 can be made of woven or non-woven fabric. The fabric for the liner 27 may be tightly woven or it may be an extrusion-coated non-woven fabric that is subjected to needle penetration to allow water to permeate through the fabric while having the capability of retaining particles on a U.S. standard sieve 200 (opening 0.075 mm). Such liner 27 is desirably composed of one or more of the following materials: long-chain synthetic polymers composed of at least 85% by weight polyolefins, polyesters, or polyamides. A suitable woven material for the liner 27 is sold under the trade names PROPEX 7125, PROPEX 7126 and PROPEX 802, by Amoco, which is located in Nashville, Ga. Additional suitable nonwoven materials for the liner 27 are sold under the trade name LUTRADUR®, Style 7212, 5211, 7213, 7214, by Freudenberg located in Durham, N.C. An additional suitable nonwoven material for the liner 27 is sold under the trade name TREVIRA® Style 16140 or 16200, by Hoescht, located in Spartanburg, S.C.

Figure 11:
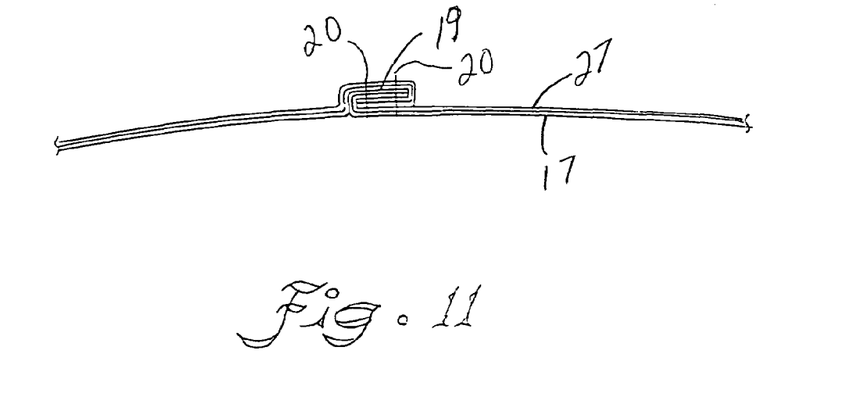
FIG. 11 is a cross-sectional view taken along the lines 11-11 in FIG. 10.

In a presently preferred embodiment shown in FIGS. 10 and 11 for example, the liner 27 is overlaid on the geotextile sheet 17 and is co-extensive in its dimensions to the geotextile sheet 17. The liner 27 and geotextile sheet 17 are then furled and joined together at the same time as by the sewing operation that is schematically shown in FIG. 10 by the sewing machine 21. After the sewing operation schematically shown in FIG. 10, the liner 27 and geotextile sheet 17 are inverted so that the liner 27 and seam 18 are disposed inside the container 14 while the geotextile sheet 17 is disposed outside container 14.

The multiple thickness spiral seam 18 results in several thicknesses of fabric that act as a reinforcing rib 18. Since the geotextile fabric 17 has minimum strength values of 1,000 lbs/in, the four thickness reinforcing rib 18 may offer strengths on the order of 4,000 lbs/in. Thus, the seam 18 forming the spiral shaped reinforcing rib 18 is more resistant to elongation than the two thicknesses of the two fabrics 17,27 that compose the vast majority of the area of the walls of the body of the geotextile container 14. The spiral rib 18 has the effect of conforming the exterior shape of the geotextile container 14 into more of a circular cylinder than an ellipsoidal cylinder as the container is filled with solid material.

The steps taken during the process of filling the container 14 are schematically shown in the sequence of FIGS. 12A and 12B, 12C and 12D, 12E and 12F, 12G and 12H, and 12I and 12J. Moreover, a view of a filled section of the container 14 is shown in FIG. 5D. The above-noted conforming effect of the ribs 18 on the cylindrical shape of container 14 in turn has the effect of lifting the height of the container 14 in the direction that is perpendicular to the length of the container in the vertical direction. This cylindrical conforming effect is believed to result from the fact that the rib portions 18 of the container 14 resist elongation more than the wall portions of the container and thus tend to pull the side surfaces 40 (see FIGS. 12B, 12D, 12F, 12H and 12J) of the container towards the central longitudinal axis of the container 14. This phenomenon is believed to be analogous to the effect of heating a bimetallic strip of metal to cause the strip to bend toward the metal with the lower coefficient of expansion.

Figure 4A:
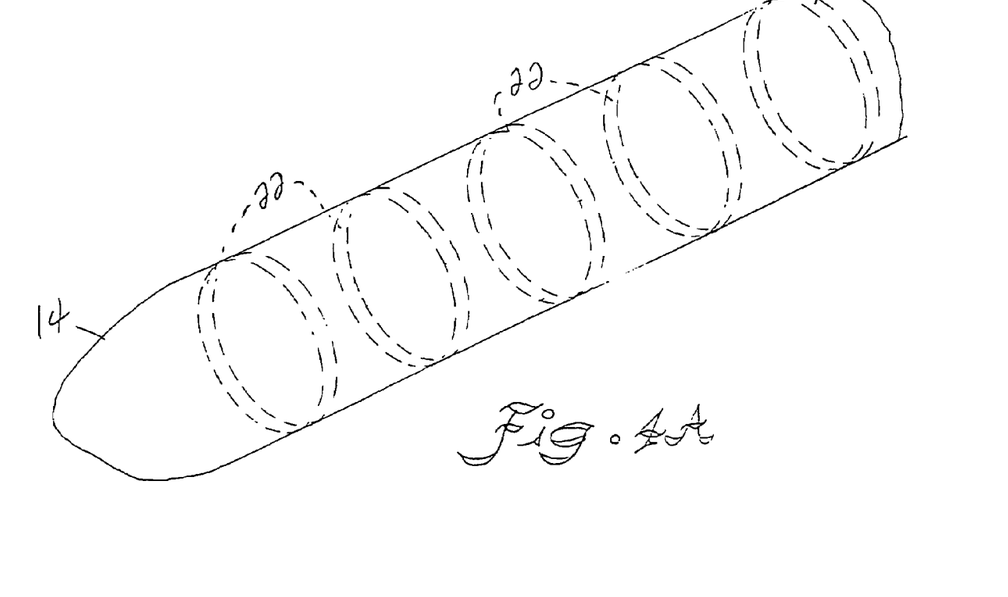
FIG. 4A is a schematic representation of a partial perspective view of an embodiment of the present invention.

In an alternative embodiment shown schematically in FIG. 4A for example, separate circular hoops 22 can be attached to and deployed around the inside of the container 14 in a spaced apart relation from one another along the length of the container. Each hoop can be composed of multiple thicknesses of the geotextile fabric 17. Each hoop 22 also can be formed of some other material provided the other material has a greater resistance to elongation under stress than whatever material composes the walls of the container 14. These spaced apart circular hoops 22 are believed capable of producing a lifting effect that is similar to the one that is described above and attributed to the spiral rib 18.

Figure 4B:
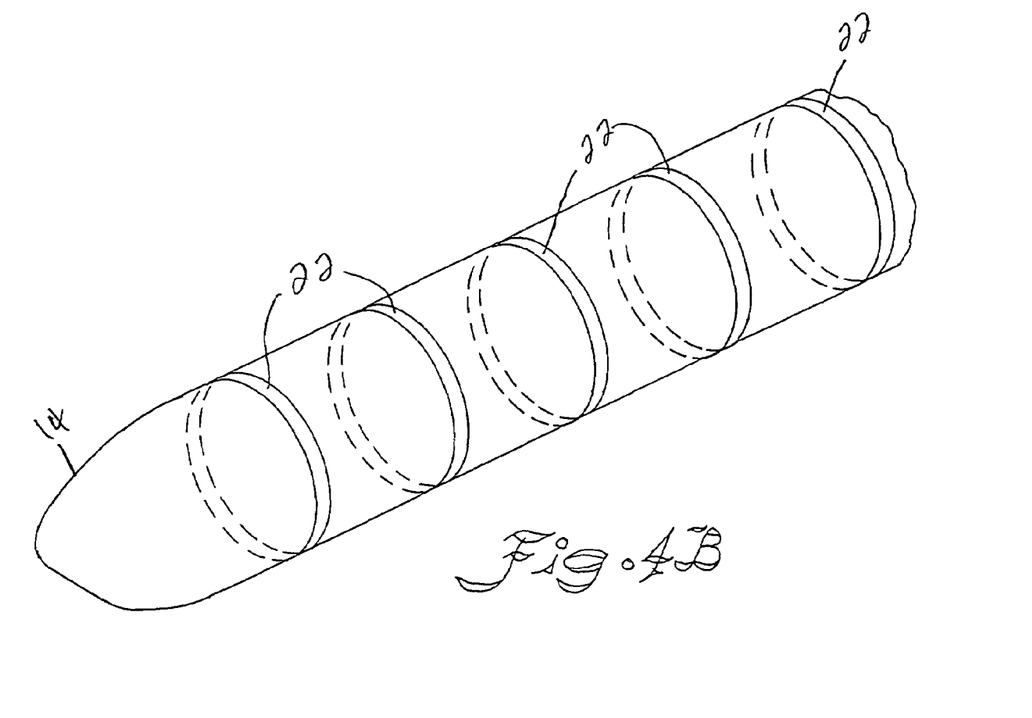
FIG. 4B is a schematic representation of a partial perspective view of an embodiment of the present invention.

In a related embodiment shown schematically in FIG. 4B for example, the circular hoops 22 are attached to the outside of the container 14. In still another similar embodiment (not shown), fabric hoops can be attached to the walls of the container 14 but disposed at an angle with respect to the longitudinal axis of the container as opposed to transversely like in FIGS. 4A and 4B. These biased hoops become sort of a hybrid between the spiral seam 18 and the circular hoops 22 and may be disposed either on the inside or the outside of the container 14.

Figure 5A:
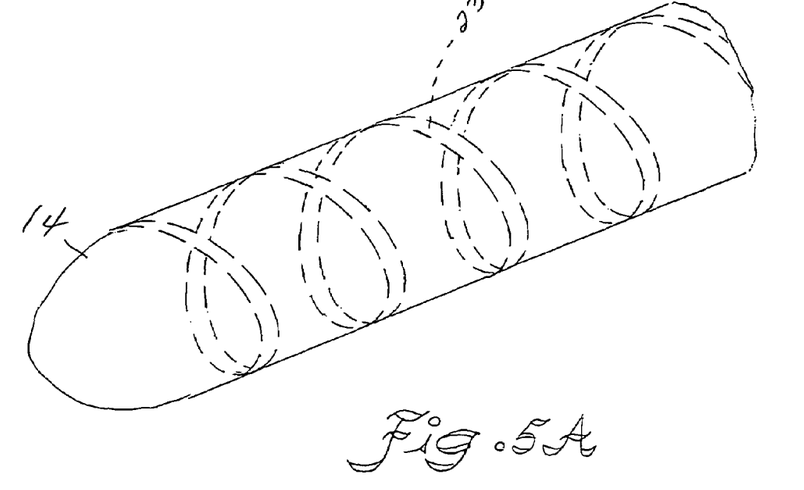
FIG. 5A is a schematic representation of a partial perspective view of an embodiment of the present invention.
Figure 5B:
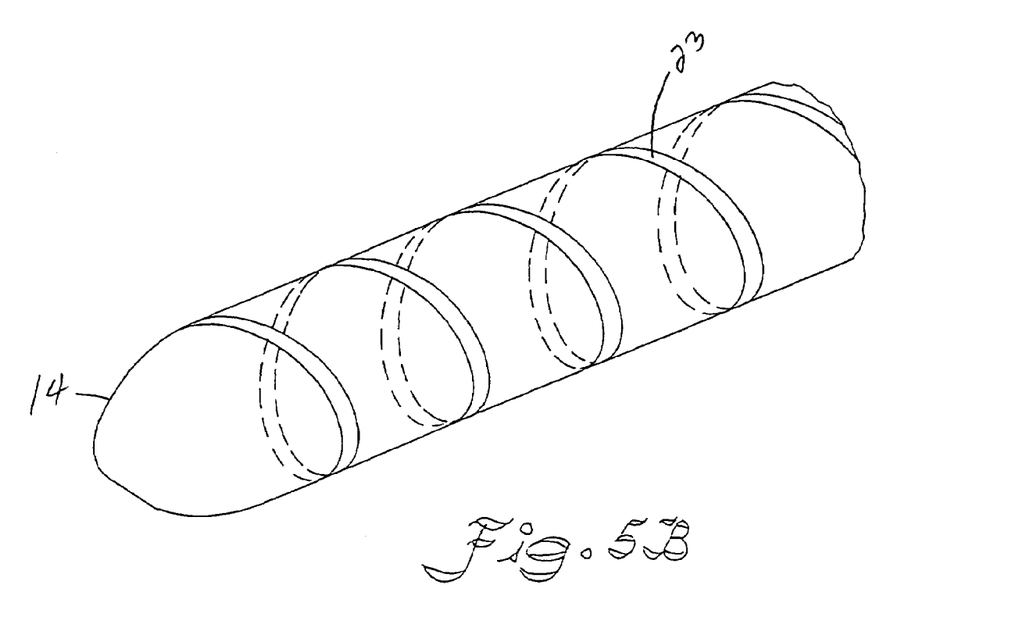
FIG. 5B is a schematic representation of a partial perspective view of an embodiment of the present invention.
Figure 5C:
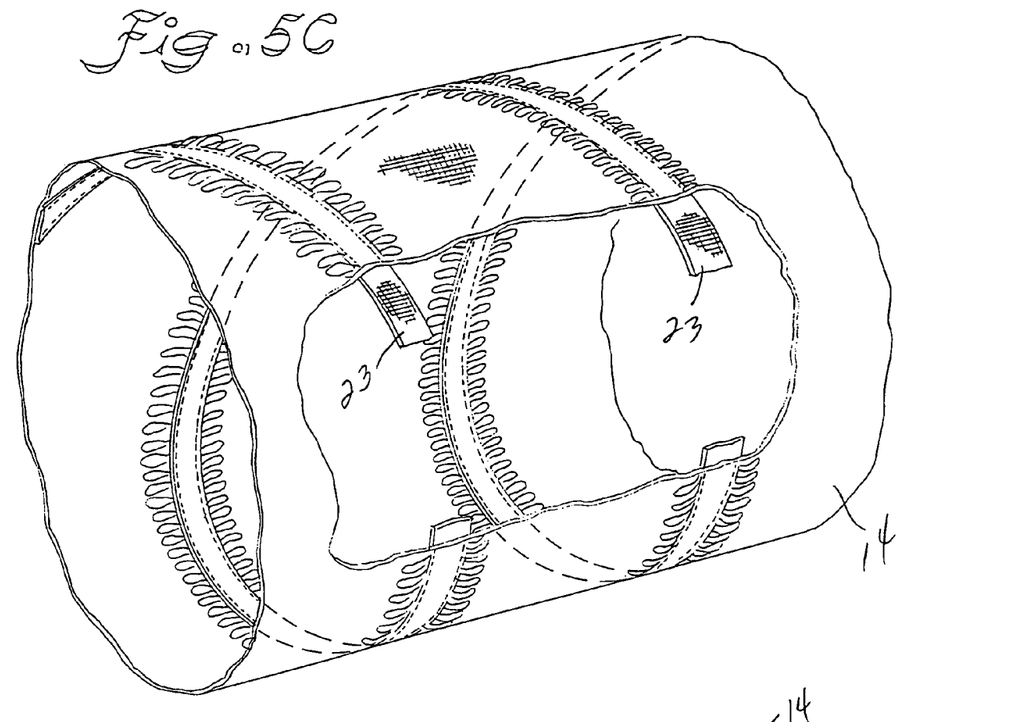
FIG. 5C is an elevated perspective view with portions cut away and portions shown in phantom (dashed line) of a section of the embodiment of the present invention shown schematically in FIG. 5A.
Figure 5D:
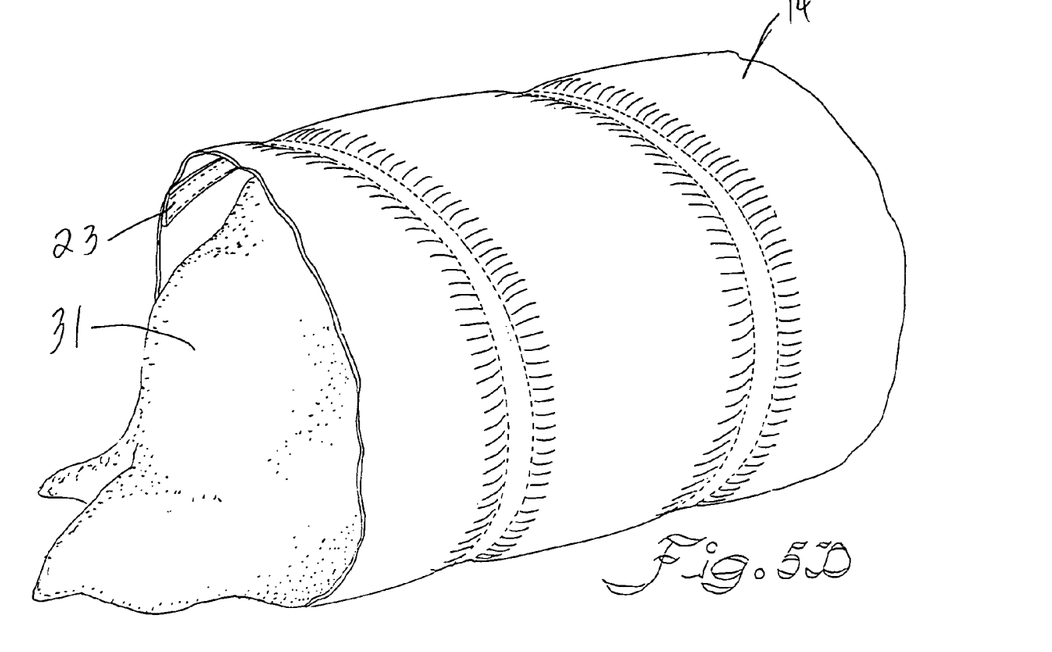
FIG. 5D is an elevated perspective view of part of the embodiment shown in FIG. 5C, but filled with solid material and without the sections shown in phantom (dashed line)

In another embodiment shown schematically in FIGS. 5A, 5C and 5D for example, a belt 23 is attached in a spiral shape to the inside of the container 14. As with the hoops 22 noted above, belt 23 can be formed of multiple thicknesses of the geotextile fabric 17. Belt 23 also can be formed of some other material having a greater resistance to elongation under stress than the fabric 17 composing the walls of the container 14. In yet another embodiment shown schematically in FIG. 5B for example, the same belt 23 is attached to the outside of the container 14.

In still another alternative embodiment shown in FIG. 8A for example, the sheet 17 of geotextile material can be specially woven so that one or more reinforced regions 24 is provided to form a ribbon along the length of sheet 17 of geotextile material. These reinforced regions 24 are woven with extra strength yarn that is substantially stronger than the yarn used to weave the rest of the sheet 17. These reinforced regions 24 can be provided lengthwise as in FIG. 8A for example, or cross-wise spanning the width of sheet 17 as shown in FIG. 9 for example. Other patterns for the orientation of the reinforcing regions 24 are possible. The provision of reinforcing regions 24 must be oriented so as to result in the location of the desired reinforcing regions 24 appropriately when the sheet 17 is fabricated into the geotextile container form. Thus, the disposition of the reinforcing regions 24 will depend upon whether the sheet 17 is going to be furled helically as in FIG. 8A or joined along its elongated edges as in FIG. 9. The reinforced regions 24 of sheet 17 perform the same function as the ribs 18, hoops 22, and belts 23 described above.

The reinforcing rib(s) 18, hoop(s) 22, belt(s) 23 or reinforced region(s) 24 act(s) as independent lifts during the fill process and allow the geotextile container 14 to be filled or re-filled at any time. Conventional geotextile containers usually cannot be staged filled or re-filled once a limited amount of solid fill 31 has been introduced due to the inability to lift up the settled container again. Flanges can be provided to define inlet openings and outlet openings through the wall of the main geotextile container 14. These flanges can be formed in different sizes. Typical sizes for the flanges would be in diameters of eight (8) inches, ten (10) inches, or twelve (12) inches, and can be installed very easily when the container 14 is already on site and deployed if needed. Typically, each flange is composed of an annular PVC ring deployed on both sides of the fabric composing the wall of the container 14 and surrounding the circular (or other shaped) opening cut through the fabric. A gasket can also be sandwiched between each PVC ring of the flange and the fabric, and all of the components can be covered with epoxy.

Figure 7:
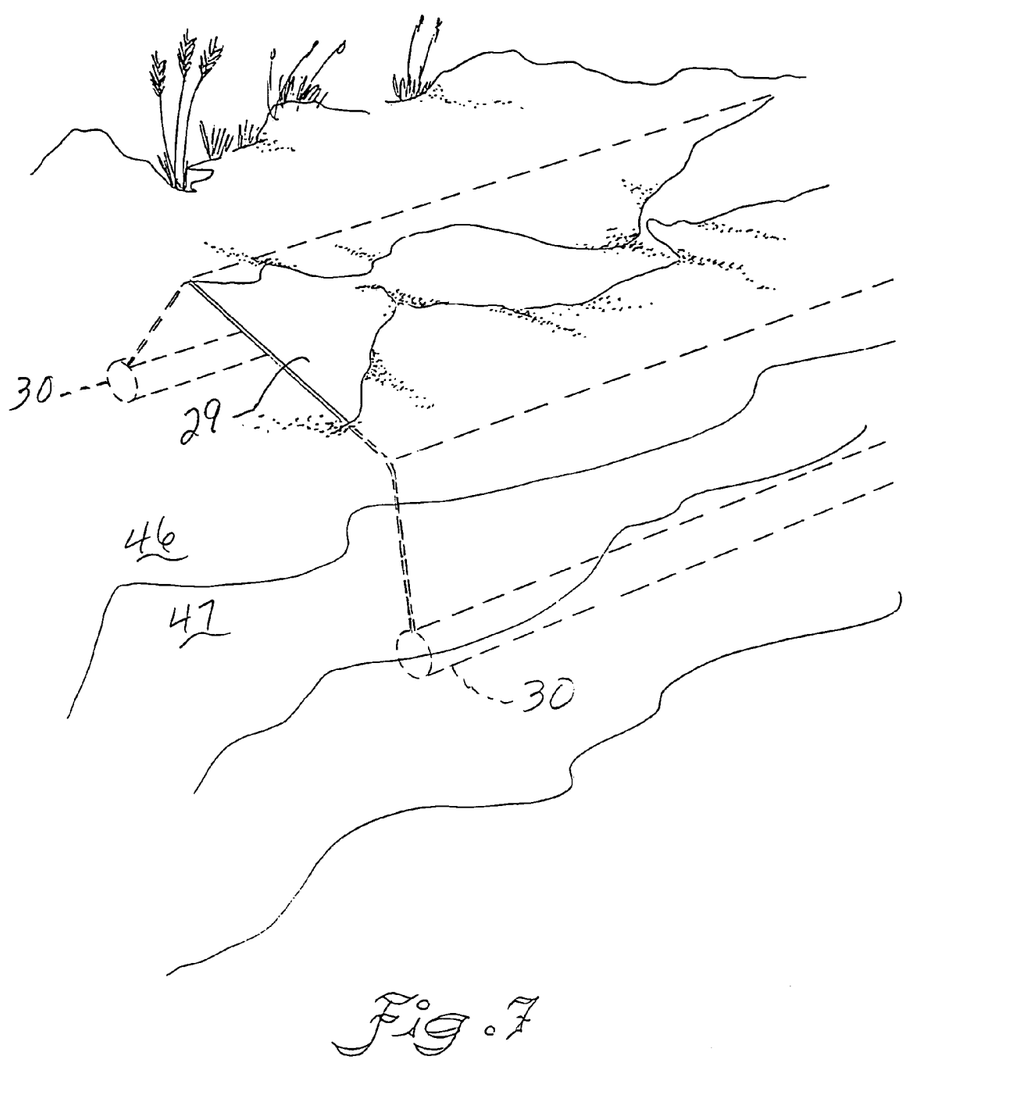
FIG. 7 is an elevated perspective view of the embodiment of FIG. 6 deployed on a beach and shown in a dashed outline.

As shown in FIG. 7, before beginning the process of filling the main geotextile container 14, a blanket 29 forming a scour apron is placed into position at the site such as along the shoreline 46 along the water's edge 47. The blanket 29 is desirably composed of geotextile fabric and is held in position by anchor tubes 30 connected to the blanket and disposed fore and aft of the blanket. As shown in FIG. 2 for example, the anchor tubes 30 are filled with sand or other solid fill material 31 and buried beneath the geotextile containers base elevation, which is the line designated by the numeral 32.

As shown in FIGS. 2 and 3 for example, each anchor tube 30 can contain more than one filler tube 33. As shown in FIGS. 2 and 3, two filler tubes 33 are disposed within each anchor tube 30. Each filler tube 33 can be formed of the same material as the liner 27 described above in connection with the fabrication of the main geotextile container 14. As shown in FIG. 2 for example, fill material 31 is used to occupy the volume defined inside the internal cavity of each filler tube 33. The combined volumes of the filler tubes 33 substantially fill up the internal cavity of each anchor tube 30. Moreover, with two filler tubes 33 disposed within each anchor tube 30, each anchor tube 30 is less likely to shift its location despite the application of forces directed transversely to the length of each anchor tube 30. This resistance to movement results from the two filler tubes 33 falling against one another so as to oppose movement in both transverse directions to the length of the tubes 30, 33. Thus, the tubes 30, 33 are not likely to be rolled when a force transverse to the length of the tube is applied such as by a wave moving up the beach.

Figure 6:
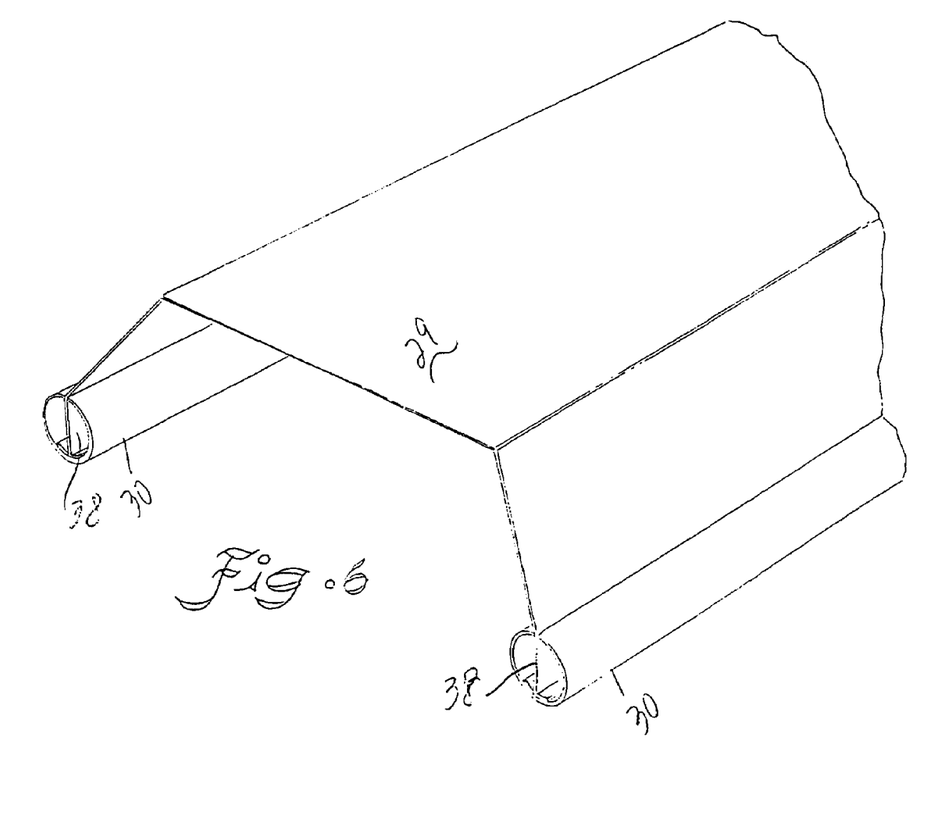
FIG. 6 is a schematic representation of a component of an embodiment of the present invention.

In an alternative embodiment as shown in FIG. 6 for example, each anchor tube 30 can have one or more partition 38 that subdivides the interior cavity of each anchor tube 30 into two or more compartments that run the entire length of each anchor tube 30. Though not shown, each compartment is provided with its own inlet for purposes of filling each compartment with solid fill material.

In accordance with the present invention and as shown schematically in FIGS. 2 and 3 for example, a pair of smaller diameter tubes 34 will be placed atop the scour apron 29 and spaced apart from and parallel to one another. This pair of so-called cradle tubes 34 forms a cradle into which the geotextile container 14 may be placed. The spacing between the cradle tubes 34 should be approximately the same as the anticipated width of the base of the main geotextile container 14. For example, a main geotextile container having a thirty (30) foot circumference with a seven (7) foot height would require approximately an eight (8) foot base. Accordingly, the cradle tubes 34 for this main geotextile container 14 should be spaced about eight (8) feet apart.

The cradle tubes 34 desirably are formed of the same material as used to make the liner 27 described above for the main geotextile container 14. The cradle tubes 34 desirably are filled with water or solid fill material such as sand. The cradle tubes also can be filled with a combination of solid fill material and water. Since the water will eventually drain out of the cradle tubes 34, if they are only to be filled with water, they should only be filled when there will be enough time to complete the filling of the main container 14 before the water leaks out of the cradle tubes 34.

As shown in FIGS. 2 and 3 for example, each cradle tube 34 can contain more than one filler tube 33. As shown in FIGS. 2 and 3, two filler tubes 33 are disposed within each cradle tube 34. Each filler tube 33 can be formed of the same water permeable material as the liner 27 described above in connection with the fabrication of the main geotextile container 14. As shown in FIG. 2 for example, fill material 31 is used to occupy the volume defined inside the internal cavity of each filler tube 33. The combined volumes of the filler tubes 33 substantially fill up the internal cavity of each cradle tube 34. Moreover, with two filler tubes 33 disposed within each cradle tube 34, each cradle tube 34 is less likely to shift its location despite the application of forces directed transversely to the length of each cradle tube 34. This resistance to movement results from the two filler tubes 33 falling against one another so as to oppose movement in both transverse directions to the length of the tubes 33, 34. Thus, the tubes 33, 34 are not likely to be rolled when a force transverse to the length of the tube is applied such as by a wave 47 moving up the beach 46. However, the cradle tubes 34 are desirably attached to the scour apron 29 to afford a more certain and secure alignment of the main geotextile container 14.

Figure 12A:
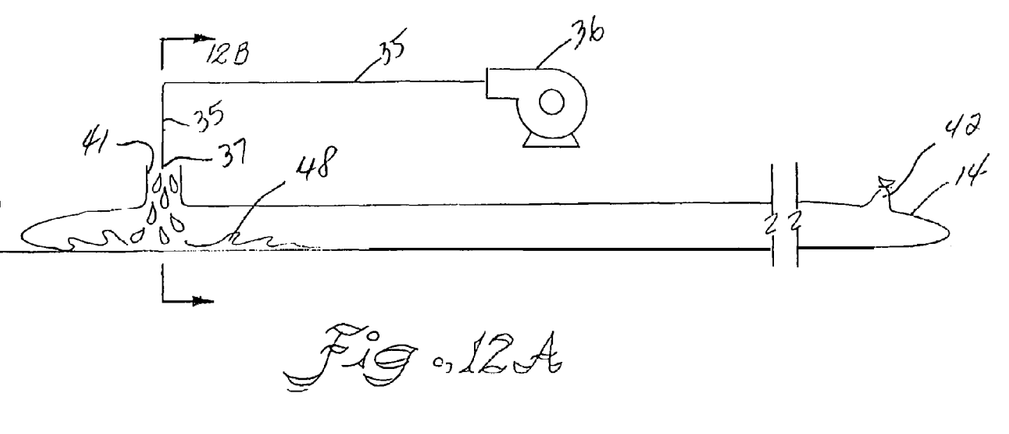
FIG. 12A is a schematic representation of part of the method of the present invention.

The unfilled carcass of the main geotextile container 14 is spread out evenly spaced between the two parallel cradle tubes 34 along the entire length of the cradle formed between the cradle tubes. Care is taken in spreading out the carcass of the main geotextile container 14 to make sure that there are no impediments that would prevent the main container from elevating into the desired profile as container 14 is being filled. When filling main geotextile container 14, a discharge pipe 35 can be connected to a pump 36 as schematically shown in FIG. 12A. An elbow pipe (not shown), desirably formed of poly-vinyl-chloride (PVC), is desirably attached to the discharge end 37 of the discharge pipe 35 before inserting the discharge pipe through one of the inlet flanges of the geotextile container 14. The elbow pipe is desirably inserted in a manner so that the outlet of the elbow is pointed so as to direct the discharge effluent down the center of the main container 14 and toward the far end of the length of the main geotextile container.

Figure 12B:
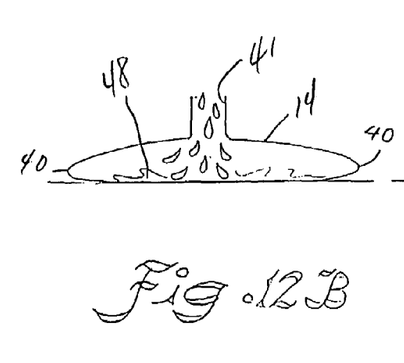
FIG. 12B is a cross-sectional view taken along the line of sight 12B-12B in FIG. 12A.
Figure 12C:
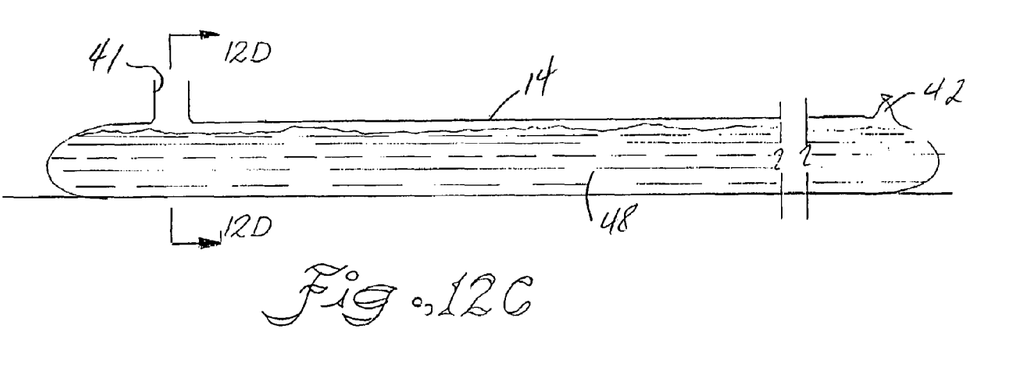
FIG. 12C is a schematic representation of another par
Figure 12D:
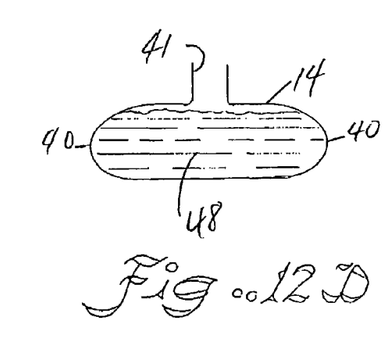
FIG. 12D is a cross-sectional view taken along the line of sight 12D-12D in FIG. 12C.
Figures 12E, 12G:
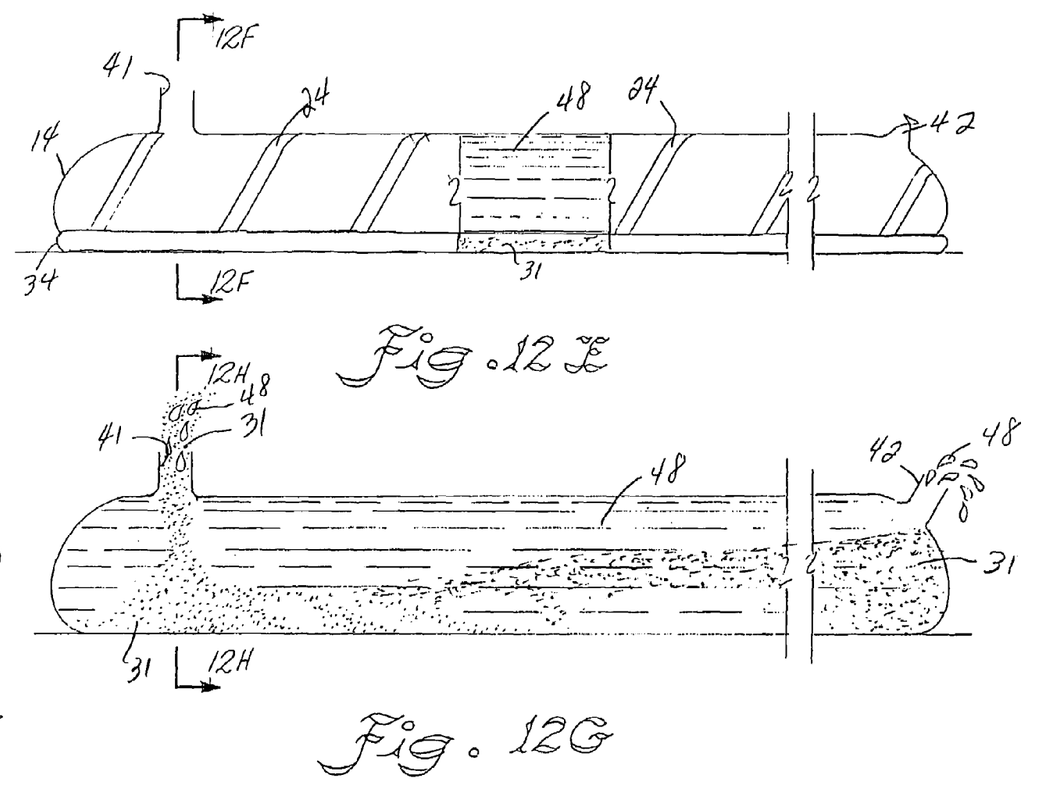
FIG. 12E is a schematic representation of yet another part of the method of the present invention.
FIG. 12G is a schematic representation of yet another part of the method of the present invention.
Figure 12F:
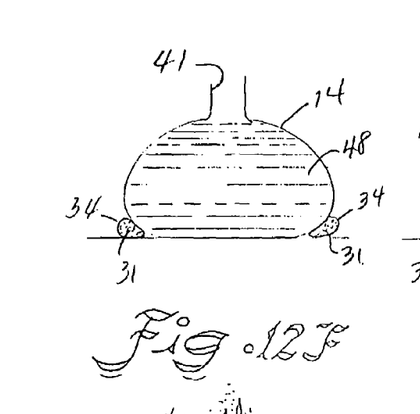
FIG. 12F is a cross-sectional view taken along the line of sight 12F-12F in FIG. 12E.

As schematically shown in FIGS. 12A and 12B, the main geotextile container 14 is initially filled with water 48 via inlet opening 41 while outlet opening 42 remains closed. As schematically shown in FIGS. 12C and 12D, the container 14 is filled with water 48 until the container achieves the desired profile resembling a sausage shown in FIGS. 12E and 12F for example. As shown in FIGS. 12E and 12F, visual inspection during the filling process should reveal that the width of the container 14 is forming into the cradle by expanding at the base to butt against the cradle tubes 34 and producing an alignment that is identical to that of the cradle.

Figure 12H:
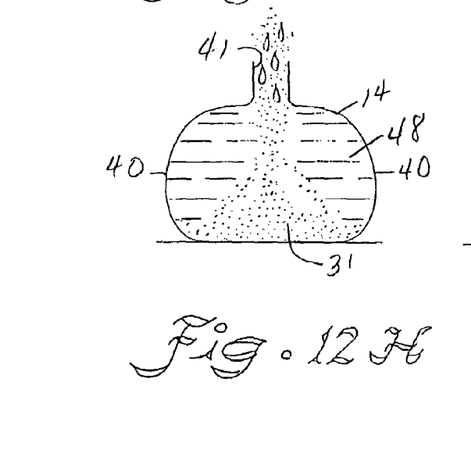
FIG. 12H is a cross-sectional view taken along the line of sight 12H-12H in FIG. 12G.
Figure 12I:
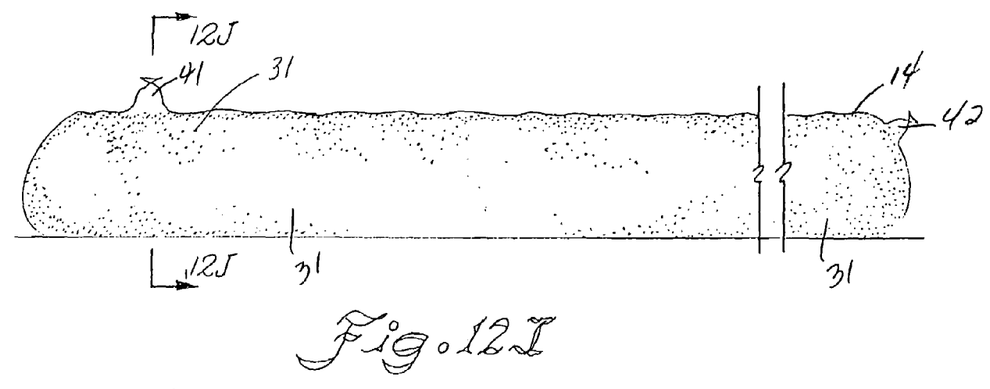
FIG. 12I is a schematic representation of yet another part of the method of the present invention.

As shown schematically in FIGS. 12G and 12H, after the main geotextile container 14 achieves the desired profile when filled with water, solids 31 are pumped into the container along with water 48. As shown schematically in FIG. 12G, as solids 31 are introduced into the container 14, the solids 31 will immediately begin to fall out of suspension. The solids 31 fall out of suspension beginning primarily at the far end of the container 14 near the outlet opening 42 since this is the end of the container that is located the farthest from the discharge effluent that is entering the inlet opening 41 to fill the container. The time needed for the solids 31 to leave suspension in the water is determined mainly by the type of soil, i.e., sandy, clay, silt, organic, etc., composing the solids.

As shown schematically in FIG. 12G, the main geotextile container 14 will continue to fill until the pressure inside the container forces fluids 48 out of the one or more outlet opening 42 defined by the flanges (not shown). As the solid fill 31 displaces water 48 from inside the container 14, a channel will form in the deposited solids, and this channel extends down the center and upper portion of the main geotextile container 14. This channel is maintained by constant water flow and increased water velocity as the channel becomes smaller in diameter. As shown schematically in FIG. 12G for example, this increased water velocity allows the water 48 to exit faster from an outlet opening 42 of the container 14 and be displaced by solids 31. As shown schematically in FIG. 12I, the solids 31 eventually will deposit along the entire length of the main geotextile container 14.

In order to control the discharge from each outlet 42, it is recommended to attach a flexible pipe (not shown) to the flange at the outlet opening 42 to route the discharge of water from the main geotextile container 14 into a contained area, thus addressing environmental concerns. Depending on the suspension time of the fill 31, it may be necessary for the geotextile container 14 to be filled in several stages. The filling ceases between the filling stages in order to allow the solids 31 to fall out of suspension and settle inside the container 14. The configuration of the main geotextile container 14 with the lifting rib(s) 18, hoop(s) 22, belt(s) 23 and/or reinforcing region(s) 24 (see FIG. 12E for example) of the fabric 17 is designed so as to permit filling in more than one stage.

Each geotextile container 14 can be physically joined end-to-end with another geotextile container 14. Any of several ways of joining the two containers can be employed, and one such method is disclosed in U.S. Pat. No. 5,059,065, which is hereby incorporated herein by this reference. In another method, the ends are butted properly with a filter fabric placed behind each joint to keep the placed material from scouring.

When a geotextile container of the present invention is deployed in the water in the vicinity of a shoreline 46 for example, the container 14 lies flat on the bed of the body of water 47. Hoses are attached to the inlet openings 41 of the container, and water 48 is pumped into the container. As schematically shown in the sequence of FIGS. 12A, 12D, and 12F, as the volume of the internal cavity of the container 14 fills with water, the portion of the container that contacts the bed of the body of water in which the container is deployed, begins to diminish and the vertical height of the container above the bed begins to increase. Because some embodiments of the geotextile container 14 of the present invention have a spiral seam 18 (hoops 22, belts 23 and/or reinforcing portions 24) running longitudinally along the length thereof, as the container 14 fills up with water, the shape of the container begins to resemble a hemi-cylindrical shape such that the transverse cross-sectional shape takes on the appearance of a semi-circle with the secant portion of the semi-circle forming the uppermost boundary farthest from the bed. Once the main geotextile container 14 is filled with water to about 70% of the volume of the cavity defined inside the container, the flow of water to the container can be discontinued. Thereafter, as schematically shown in FIGS. 12G and 12H, a slurry of sand 31 and water 48 is pumped into the container 14 through various inlet openings 41, while other outlet openings 42 are opened so that the water 48 is discharged from the container 14 as the sand and/or other solid fill 31 enters the container and displaces the water from the container.

Figure 12J:
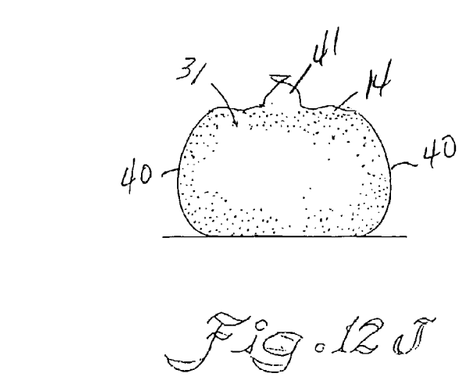
FIG. 12J is a cross-sectional view taken along the line of sight 12J-12J in FIG. 12I.

The pumping of solid fill 31 into the container 14 continues until the container is about 70% filled with solid fill 31. Then the pumping discontinues and the inlet and outlet openings 41, 42, respectively, are sealed as shown schematically in FIGS. 12I and 12J. The container 14 then assumes the shape of a cylinder that is relatively flat on the uppermost surface. The containers surface contacting the bed of course takes on the contour of the bed beneath the container 14. As schematically shown in FIG. 12J, the side surfaces 40 of the container 14 take on the shape of a cylindrical surface. Because of the strength of the containers 14 of the present invention (the strength is believed to be a consequence of the spiral seam 18, hoop(s) 22, belt(s) 23 and/or reinforcing region(s) 24 of the fabric 17 running along the length of the container), the containers can be filled to a height of 15 feet or more above the bed without rupturing under the stress of the solids 31 (e.g., sand) deposited inside the container. Moreover, it is possible to top off the remaining 30% of the volume of the interior cavity of the container 14 with water by pumping water into the container until the container is completely full and takes on the shape of a cylinder on the uppermost surface. Since the container in this instance is filled with water 48 atop a base of sand or other solids 31, the upper portion filled with water acts as an energy-absorbing damper that will absorb the energy of waves traveling along the surface of the body of water. So configured, the container 14 protects the shore from the force of these waves. Thus, when a hurricane or other condition that is likely to produce high waves along the shore is imminent, the containers of the present invention can be topped off with water to provide the extra protection of the shoreline afforded by the energy-absorbing characteristics of the upper portions of the containers that are filled with the water.

Figure 13A:
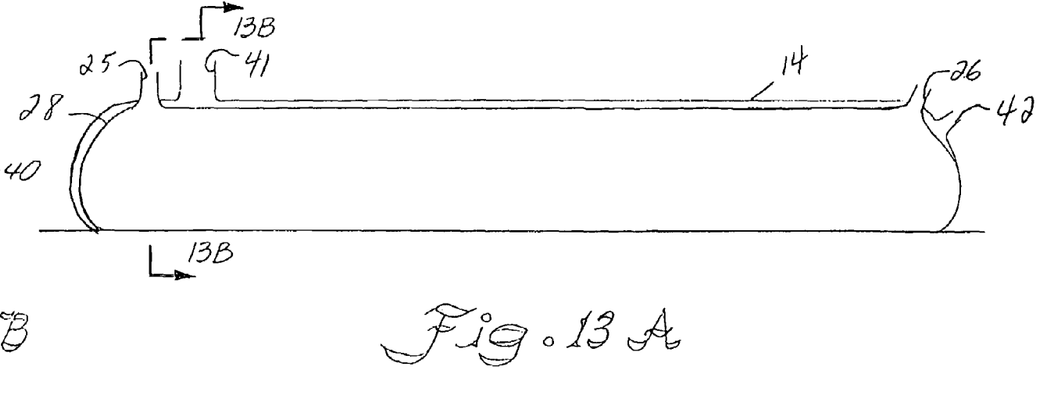
FIG. 13A is a longitudinal cross-sectional view of an alternative embodiment of a component of the present invention taken along the line of sight from left to right in FIG. 13B.
Figure 13B:
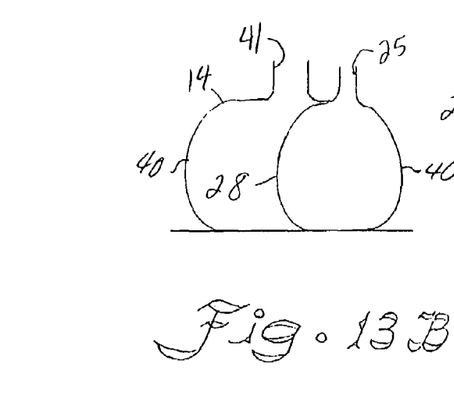
FIG. 13B is a cross-sectional view taken along the line of sight 13B-13B in FIG. 13A.

In an alternative embodiment of the geotextile container 14, at least one ballast tube 28 can be provided to fill up most of the volume of the internal cavity defined within each main geotextile container 14. Each ballast tube 28 can be separately filled with solid fill material 31 in the same manner as described above for the filling of a geotextile container 14 that does not contain any ballast tubes 28. Accordingly, as schematically shown in FIGS. 13A and 13B, each ballast tube 28 will have its own inlet opening 25 and outlet opening 26. Though not shown, each ballast tube 28 can have several inlet openings 25 and outlet openings 26 along its length. In an embodiment shown in FIGS. 13A and 13B, the inlet opening 25 and outlet opening 26 of ballast tube 28 can be accessed via openings formed through the wall of the main geotextile container 14. In some embodiments, the inlet openings 25 and outlet openings 26 of the ballast tube 28 can be accessed through the inlet opening 41 and outlet openings 42, respectively, for the geotextile container 14.

Each ballast tube 28 is desirably formed of the same material as used to form the liner 27 described above and thus the walls of the ballast tube 28 are water permeable. In a presently preferred embodiment, a slurry of solid fill material 31 and water 48 is pumped into each ballast tube 28. When the liner material is used to form the ballast tube 28, any remaining water that is not displaced by the solid fill material, eventually will leak out of the ballast tube 28 as well as out of the geotextile container 14 over time, leaving only the solid fill material 31 and some unfilled volume in the interior cavity of the ballast tube 28 and geotextile container 14. Accordingly, the ballast tubes 28 desirably are filled with solid fill material 31 such as sand or whatever soil is available at the site. Thus, if only water is to be used to fill the ballast tubes 28, then a material different than the liner material must be used and that material must be impermeable to water.

In a presently preferred embodiment shown in FIG. 2 for example, a protective shroud 44 can be provided to cover the exposed upper half of the surface of container 14. Shroud 44 desirably is a sheet of geotextile fabric that runs the entire length of container 14 and is wide enough to cover the exposed upper half of container 14.

In one embodiment of the invention, a fluid control mechanism is set up whereby a strong outer skin that is largely impermeable (partially permeable) is provided as the geotextile container. Then, an optional inner liner that is waterproof can be employed. Ballast tubes within the container that are semi-permeable can facilitate water staying within the outer skin or outer geotextile container, but still allowing fluid movement between ballast tubes. The outer container may be made impermeable by any number of methods, including using a fabric or material that is impermeable, or coating a permeable material with a coating to render it substantially impermeable, as two examples. The container may be coated, or may have an impermeable inner liner to prevent water movement out of the container.

Thus, the invention may comprise a system for maintaining fill material solids in position to form a barrier or dam, the system comprising: a first elongated tube of partially permeable geotextile material; and (b) a plurality of ballast tubes located within the first elongated tube, the ballast tubes being generally semi-permeable.

A liner formed from a generally waterproof fabric that is applied to the inside surface of the first elongated tube of geotextile material. The system may be provided wherein the first elongated tube of partically permeable geotextile material is comprised of polyester or polypropylene.

In one aspect of the invention, the system is provided in which the coating is selected from the group of coatings consisting of: polyvinyl chloride, polyethylene, and polypropylene. Other polymeric materials may be used as well.

Further, it is sometimes advantageous to provide ballast tubes that are longer than the geotextile container. Thus, an apparatus for forming a barrier may be provided in which the ballast tubes are configured to receive fill material solids on their respective inside spaces.

In one apparatus of the invention the elongated container is made impermeable either by: (i) coating a geotextile fabric which is employed as an elongated container, or (ii) by employing an impermeable geotextile fabric as an elongated container.

In one aspect of the invention, a method of forming a barrier or dam using solid materials is provided. The method includes providing an elongated container and providing a plurality of independent ballast tubes within the container. Each ballast tube is enclosed such that there is no substantial communication or flow between independent ballast tubes. In a further step, a water/solids slurry is pumped into the elongated container.

In one embodiment of the invention a system for maintaining fill material solids in position to form a barrier or dam a water environment is provided. The system comprises a first elongated tube having an interior and exterior, the tube being made of substantially impermeable geotextile material. Further, a plurality of ballast tubes are located within the first elongated tube, the ballast tubes being generally semi-permeable. Fill material solids are held in position within ballast tubes, and water is capable of moving into or out of ballast tubes, the overall barrier or dam being essentially watertight on its exterior surface due to impermeability of the geotextile material, thus resulting in minimal net water flow to the exterior of the first elongated tube. In one feature of the invention, the first elongated tube of geotextile material can be made impermeable by applying a coating on the exterior surface of said first elongated tube to render the geotextile material less permeable. The first elongated tube of geotextile material may be comprised of base fibers selected from the group of fibers consisting of: polyester, polypropylene, and synthetic fibers. In one aspect of the invention, the coating may be rendered compatible with the base polymeric fibers. Essentially any effective water resistant coating may be used. Examples of such coatings include polyvinyl chloride, polyethylene, and polypropylene.

A system for maintaining fill material solids also is featured in the invention. The system is provided in position to form a barrier or dam in a water environment. The system includes a first elongated tube having an interior and exterior, the tube being constructed of partially permeable geotextile material having an inner liner of substantially waterproof fabric. Additionally, a plurality of ballast tubes are located within the first elongated tube, the ballast tubes being generally semi-permeable. The fill material solids are held in position within ballast tubes, and water is capable of moving into or out of ballast tubes, the overall barrier or dam being essentially watertight on its exterior surface due to impermeability of the liner material, thus resulting in minimal net water flow to the exterior of the first elongated tube.

In yet another embodiment of the invention, an apparatus for forming a barrier is provided comprising an elongated container having two ends. Additionally, a plurality of independent ballast tubes are provided extending longitudinally within the container, the ballast tubes each having an inside and an outside space. The ballast tubes are configured to receive fill material solids on their respective inside spaces. Further, at least one ballast tube is longer than the elongated container. The container may be secured along its length by hoops. The hoops are comprised of a plurality of thicknesses of geotextile fabric. Further, a spiral hoop or belt is provided along the length of the container. In some embodiments, the fabric may be helically shaped and joined at a spiral seam by draping the fabric over a cylindrical drum.

While the preferred embodiments of the invention have been described using specific terms, such description is for illustrative purposes only, and it is to be understood that changes and variations may be made without departing from the spirit or scope of the following claims.

What is claimed is:

1. A system for maintaining fill material solids in position to form a barrier or dam, the system comprising:
    a first elongated sheet of geotextile material;
    a means for seaming the first elongated sheet into a first continuous tubular-shaped container having an inside space;
    at least two ballast tubes disposed within said inside space of the container;
    fill material solids held inside the ballast tubes;
    a first cradle tube positioned adjacent to the first continuous tubular-shaped container, the cradle tube being configured to maintain the first tubular-shaped container in a stable position to form a barrier or dam; and
    a plurality of filler tubes located within a cradle tube.

2. A structure that resists soil or sand erosion against high energy waves, comprising:
    (a) an elongated container; and
    (b) a plurality of independent ballast tubes within the container, the ballast tubes each having an inside and an outside space, the inside space having a lower portion and an upper portion, the ballast tubes being configured to receive fill material solids on their respective inside spaces;
    (c) wherein at least one ballast tube contains solid fill material in a lower portion of the ballast tube and a liquid in the upper portion of the ballast tube, the upper portion of the ballast tube being capable of absorbing wave energy to maintain the structure in a stationary position.

3. The apparatus of claim 2 further comprising a first cradle tube positioned adjacent to the container.

4. The apparatus of claim 2, further comprising a scour apron.

5. The apparatus of claim 4 in which the scour apron further comprises an anchor tube.

6. The apparatus of claim 4 in which the scour apron further comprises a blanket.

7. The apparatus of claim 4 wherein the scour apron supports the container on the underside of the container.

8. A system for maintaining fill material solids in position to form a barrier or dam in a water environment, the system comprising:
    (a) a first elongated tube having an interior and exterior, the tube being made of partially permeable geotextile material having an inner liner of substantially waterproof fabric; and
    (b) a plurality of ballast tubes located within the first elongated tube, the ballast tubes being generally semi-permeable;
    (c) wherein fill material solids are held in position within at least one of the ballast tubes, and water is capable of moving into or out of the ballast tubes, the overall barrier or dam being essentially watertight on its exterior surface due to impermeability of the liner material, thus resulting in minimal net water flow to the exterior of the first elongated tube.

9. An apparatus for forming a barrier, comprising:
    an impermeable elongated fabric container having an interior and an exterior;
    said container being rendered impermeable by a coating applied to the fabric;
    at least two ballast tubes disposed within the interior of the elongated fabric container, each of the at least two ballast tubes containing water; and
    wherein each of the at least two ballast tubes is configured to be semi-permeable so that the water can pass between each of the at least two ballast tubes and the interior of the container and between one of the at least two ballast tubes and the other of the at least two ballast tubes.

10. The apparatus of claim 9, wherein the coating is applied to the exterior of the container.

11. The apparatus of claim 9, wherein the coating is applied to the interior of the container.

12. An apparatus for forming a barrier, comprising:
    an impermeable elongated fabric container having an interior and an exterior;
    said container being rendered impermeable by an impermeable liner that is disposed adjacent the interior surface of the container;
    at least two ballast tubes disposed within the interior of the elongated fabric container, each of the at least two ballast tubes containing water; and
    wherein each of the at least two ballast tubes is configured to be semi-permeable so that the water can pass between each of the at least two ballast tubes and the interior of the container and between one of the at least two ballast tubes and the other of the at least two ballast tubes.

13. An apparatus for forming a barrier, comprising:
    an impermeable elongated fabric container having an interior and an exterior;
    said container being rendered impermeable by an impermeable liner that is disposed around and encloses the at least two ballast tubes in the interior of the container;
    at least two ballast tubes disposed within the interior of the elongated fabric container, each of the at least two ballast tubes containing water; and
    wherein each of the at least two ballast tubes is configured to be semi-permeable so that the water can pass between each of the at least two ballast tubes and the interior of the container and between one of the at least two ballast tubes and the other of the at least two ballast tubes.

14. An apparatus for forming a barrier, comprising:
    an impermeable elongated fabric container having an interior and an exterior;
    solid fill materials disposed within the interior of the container;
    at least two ballast tubes disposed within the interior of the elongated fabric container, each of the at least two ballast tubes containing water; and
    wherein each of the at least two ballast tubes is configured to be semi-permeable so that the water can pass between each of the at least two ballast tubes and the interior of the container and between one of the at least two ballast tubes and the other of the at least two ballast tubes.

* * * * *